(12) United States Patent
Stutchbury (10) Patent No.: US 9,464,407 B2
(45) Date of Patent: Oct. 11, 2016

(54) LOAD-HAUL-DUMP VEHICLE FOR CONFINED SPACES

(71) Applicant: INDUSTREA MINING EQUIPMENT PTY LTD, Sinnamon Park, Queensland (AU)

(72) Inventor: Ross Stutchbury, Thornton (AU)

(73) Assignee: Industrea Mining Equipment PTY LTD, Sinnamon Park, Queensland (AU)

( * ) Notice: Subject to any disclaimer, the term of this patent is extended or adjusted under 35 U.S.C. 154(b) by 0 days.

(21) Appl. No.: 14/403,275

(22) PCT Filed: May 24, 2013

(86) PCT No.: PCT/AU2013/000553
§ 371 (c)(1),
(2) Date: Nov. 24, 2014

(87) PCT Pub. No.: WO2013/173882
PCT Pub. Date: Nov. 28, 2013

(65) Prior Publication Data
US 2015/0176250 A1     Jun. 25, 2015

Related U.S. Application Data

(60) Provisional application No. 61/651,181, filed on May 24, 2012.

(51) Int. Cl.
*E02F 9/22* (2006.01)
*B60K 17/04* (2006.01)
(Continued)

(52) U.S. Cl.
CPC ........... *E02F 9/22* (2013.01); *B60K 17/04* (2013.01); *B60K 17/3467* (2013.01); *B60K 17/356* (2013.01); *B62D 53/026* (2013.01);
(Continued)

(58) Field of Classification Search
CPC . B62D 53/025; B62D 53/026; B60K 17/356
See application file for complete search history.

(56) References Cited

U.S. PATENT DOCUMENTS

| 3,342,282 A | 9/1967 | Forpahl |
| 3,789,943 A | 2/1974 | Kampert et al. |

(Continued)

FOREIGN PATENT DOCUMENTS

| CN | 1948638 A | 4/2007 |
| CN | 102322081 A | 1/2012 |

(Continued)

OTHER PUBLICATIONS

International Search Report and Written Opinion dated Jul. 11, 2013 which was issued in connection with PCT Patent Application No. PCT/AU13/000553 which was filed on May 24, 2013.

(Continued)

*Primary Examiner* — Kevin Hurley
(74) *Attorney, Agent, or Firm* — GE Global Patent Operation (57) ABSTRACT

A load-haul-dump (LHD) vehicle for constrained spaces such as underground mines. The LHD includes a front axle and a rear axle, and an articulation in the vehicle between the front and rear axles. A diesel engine is positioned to the rear of the rear axle, and powers a hydraulic pump. A hydraulic motor is positioned forwardly of the articulation, and is hydraulically driven by the hydraulic pump. A transmission is driven by the hydraulic motor, and drives the front axle and rear axle via respective drive shafts.

17 Claims, 9 Drawing Sheets

(51) Int. Cl.
*B60K 17/356* (2006.01)
*B62D 53/02* (2006.01)
*E02F 9/08* (2006.01)
*E02F 9/16* (2006.01)
*E02F 9/20* (2006.01)
*B60K 17/346* (2006.01)

(52) U.S. Cl.
CPC ........... *E02F9/0833* (2013.01); *E02F 9/0841* (2013.01); *E02F 9/0858* (2013.01); *E02F 9/166* (2013.01); *E02F 9/2066* (2013.01); *E02F 9/2083* (2013.01); *E02F 9/2253* (2013.01); *E02F 9/2275* (2013.01)

(56) References Cited

U.S. PATENT DOCUMENTS

| | | | |
|---|---|---|---|
| 3,865,208 A | 2/1975 | Crawshay et al. | |
| 3,888,372 A | 6/1975 | Gorby et al. | |
| 3,896,894 A * | 7/1975 | Vinton | B62D 53/025 180/235 |
| 4,662,472 A * | 5/1987 | Christianson | B60K 1/00 180/235 |
| 5,873,431 A * | 2/1999 | Butler | B62D 12/00 180/418 |
| 6,116,697 A * | 9/2000 | Smith | B62D 53/005 298/22 AE |
| 7,344,187 B2 | 3/2008 | Murakami | |
| 2001/0040355 A1* | 11/2001 | Ratcliffe | B62D 53/026 280/515 |

FOREIGN PATENT DOCUMENTS

| | | |
|---|---|---|
| DE | 2450573 A1 | 5/1976 |
| DE | 3632416 A1 | 4/1988 |

OTHER PUBLICATIONS

Unofficial English translation of Chinese Office Action issued in connection with corresponding CN Application No. 201380026964.7 on Dec. 28, 2015.

European Search Report and Opinion issued in connection with corresponding EP Application No. 13793829.6 on Apr. 22, 2016.

* cited by examiner

LOAD-HAUL-DUMP VEHICLE FOR CONFINED SPACES

CROSS-REFERENCE TO RELATED APPLICATIONS

This application is a National Stage of International Application No. PCT/AU13/000553, filed 24 May 2013, which claims the benefit of U.S. Provisional Patent Application No. 61/651,181 filed 24 May 2012, which is incorporated herein by reference.

TECHNICAL FIELD

Embodiments of the present invention relate to load haul dump vehicles having an articulated chassis, for use in confined spaces. In particular, some embodiments of the present invention relate to drive train designs for such a vehicle.

BACKGROUND OF THE INVENTION

A Load-Haul-Dump vehicle (LHD) is a mid-sized underground mining vehicle, typically up to about 60 tonnes in weight. A LHD is often used to load, haul and dump broken cuttings or ore from an open stope to a crusher or waiting truck to be transported to the surface. A LHD has wheels which are laterally fixed, and instead effects steering by way of an articulation in the chassis between front and rear axles, controlled by hydraulic steering cylinders or the like.

In coal mines, restricted roof heights demand custom designed machinery to fit the confines of the mine heading. The mine heading height is set by the coal seam height. Soft rock coal cutting machines have limited ability to cut roof or floor stone. Typical heading height in Australian seams (for example) ranges from 1800 mm to 3500 mm. Often mine services such as piping, cabling, and conveyor structures further restrict the available travelling height clearances. Old workings or restricted drift or cage access can also limit machine size. Similar height constraints often apply in mines other than coal mines.

A conventional surface loader typically has an engine directly coupled to a torque converter/transmission, with drop box to prop shaft output to axles. In this arrangement the engine and drive train are positioned above the axle as there is no pressing restriction on vehicle height. The cabin is centrally located on top of the transmission, with a forward facing seat. This layout is not possible for an underground coal application.

Underground mining vehicles have distinct design requirements to meet the demands and constraints of the underground mining environment. Size is one such constraint. The tasks of a LHD also require high traction, so that underground LHDs invariably provide drive to all four wheels and thus have a drive shaft across the articulation, and also generally require a traction aiding device in addition to a differential on each of the front and rear axles.

Figure 1:
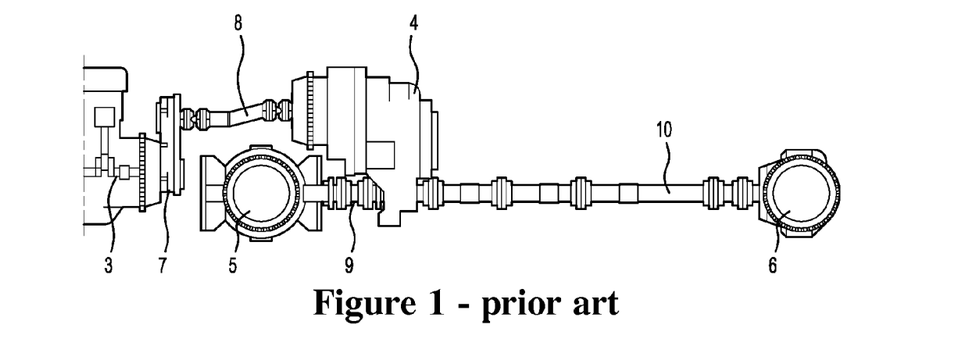
FIG. 1 illustrates the drive train of a prior art LHD vehicle.

In contrast to surface loaders, typical underground machines have a low positioned engine, positioned aft of the rear axle, with a transfer box to lift the drive line over the rear axle. FIG. 1 shows a drive train of one such previous type of underground LHD. Power from a diesel engine 3 (only partially shown) is passed via a step box 7 and transfer shaft 8 to a power-shift transmission 4. The transmission passes power to the rear axle 5 via rear drive shaft 9. Power passes to the front axle 6 via front drive shaft 10, which is articulated in order to pass the central articulation of the LHD vehicle.

Figure 2:
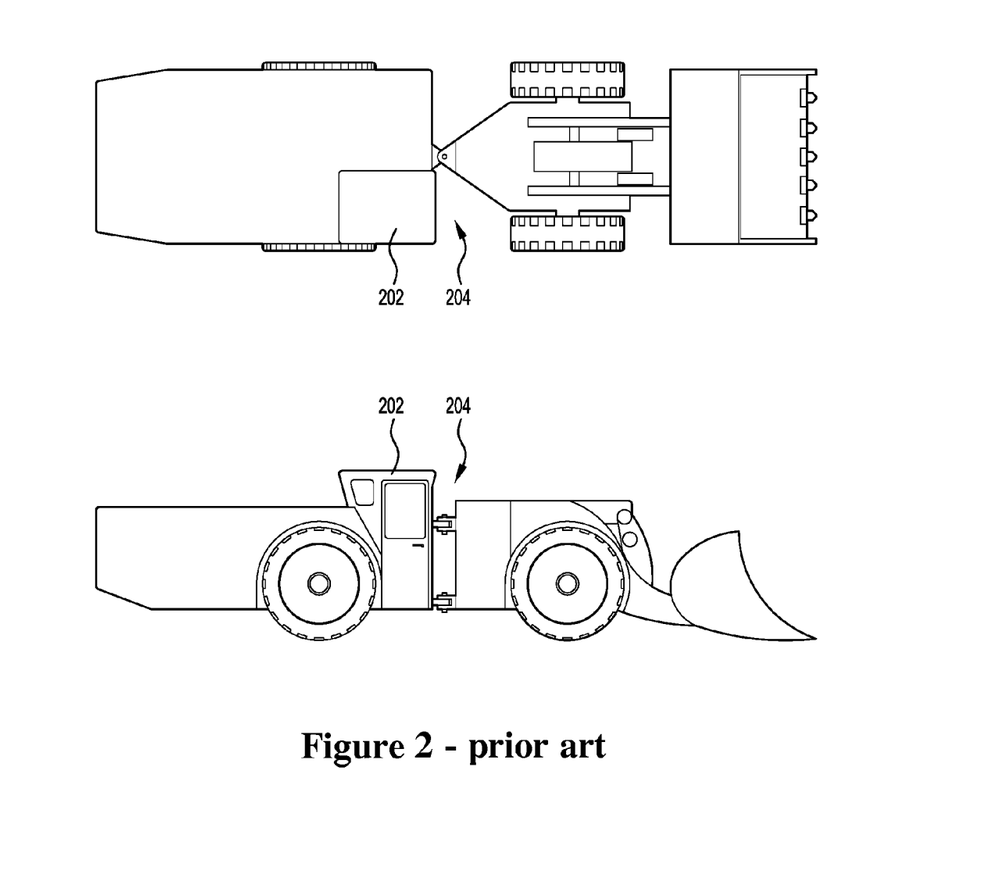
FIG. 2 illustrates the cabin position in the prior art LHD vehicle of FIG. 1.

As can be seen, in the drive train of FIG. 1 the transmission 4 is positioned in front of the rear axle 5, with a drop to prop shaft output to the drive shafts 9 and 10. This configuration in practice necessitates that the driver cabin 202 must be located to one side of the machine, in front of one of the rear wheels, as shown in FIG. 2. This is disadvantageous at least because access to the driver's cabin is via the articulation zone 204 of the machine. Because of the significant amount of reversing the LHD can be required to perform, LHDs of the type shown in FIG. 2 are sometimes configured so that the operator's seat is facing across the vehicle; and in such arrangements the driver must spend a significant amount of time with head turned, predominantly to one side.

In particular the articulation area 204 of the machine is known to be a dangerous area due to the pinch point crush hazard. Conventional LHDs having the cabin door opening into the articulation area attempt to mitigate this risk by providing controls which improve safe access to the driver's cabin. Nevertheless, with accumulator reserve steering, and the risk of the steering wheel being used as a handle to enter or exit the driver's cabin, there remains a hazard that the machine will articulate and crush the driver on entry to the machine.

Conventional LHDs also require that the driver must spend a significant time with head turned to the left or right, for example due to the placement of the cabin 202, which can cause fatigue, discomfort and even postural injury.

A further issue is that LHD machines are, due to their role, subjected to considerable demand on brakes. This often causes premature brake wear, requiring costly downtime for brake changes. As enclosed oil immersed brakes are typically used in such a heavy duty axle design, the brakes can only be changed with axle disassembly which involves considerable time and cost.

Other underground vehicles, such as chock carriers, have significantly different operating requirements, such as mobility and traction requirements.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY OF THE INVENTION

According to a first aspect the invention provides a load-haul-dump vehicle for operation in constrained spaces, the vehicle comprising: a front axle and a rear axle; an articulation in the vehicle between the front and rear axles; a motor positioned to the rear of the rear axle; a hydraulic pump powered by the motor; a hydraulic motor positioned to the front of the articulation, the hydraulic motor being hydraulically driven by the hydraulic pump; and a transmission driven by the hydraulic motor, the transmission driving the front axle and rear axle via respective drive shafts.

In some embodiments the motor is a combustion engine, such as a diesel engine. Other embodiments may utilise an electric motor.

In some embodiments of the invention, an operator cabin is positioned substantially centrally of the vehicle on a rear chassis of the vehicle, whereby a footprint of the operator cabin extends transversely at least partly across a central longitudinal axis of the vehicle. For example in some such embodiments at least 25% of an area of the footprint of the operator cabin lies on each respective side of the central longitudinal axis of the vehicle. In such embodiments at least 40% of an area of the footprint of the operator cabin lies on each respective side of the central longitudinal axis of the vehicle, and for example in some embodiments the footprint of the operator cabin is equally disposed to each side of the central longitudinal axis of the LHD vehicle. The operator cabin for example may be positioned above the rear axle, and/or forwardly of the rear axle and above a rear drive shaft. In such embodiments the operator cabin may be provided with access to the rear of the rear axle.

The operator cabin in some embodiments further comprises a rotating seat, which is rotatable between at least two rotational positions. For example the seat may be rotatable between at least two of: a forward facing position, a transverse-facing position, and an aft-facing position. In such embodiments the operator controls may be adapted to maintain the operator's perspective as defined by the current rotational position of the seat.

The operator cabin may be a tilting cabin, and may further have vertical height control.

Hydraulic hoses may be provided to effect drive of the hydraulic motor by the hydraulic pump. Such hydraulic hoses may be rigid or inflexible between the hydraulic motor and an articulation zone of the vehicle. The hydraulic hoses may be flexible across the articulation zone.

Embodiments of the invention may thus provide a vehicle having improved tip angle, as the component layout with front mounted transmission produces a balanced machine that has fundamental stability as a result of the mass distribution.

In other embodiments, the vehicle may have one or more hydrostatic vehicle retardation modes of operation, which are facilitated by the provision of a hydrostatic transmission. Vehicle retardation may comprise a multi-stage process including two or more of: (i) initial engine braking; (ii) application of additional hydrostatic braking; (iii) automatic application of the hydraulic motor to maximum displacement; and/or (iv) wet disc braking According to a second aspect of the invention, a method of powering a load-haul-dump (LHD) vehicle for operation in constrained spaces comprises: powering a hydraulic pump with a motor positioned to the rear of a rear axle of the LHD vehicle; the hydraulic pump hydraulically driving a hydraulic motor positioned forwardly of an articulation of the LHD vehicle; the hydraulic motor driving a transmission; and the transmission driving front and rear axles of the LHD vehicle via respective drive shafts.

BRIEF DESCRIPTION OF THE DRAWINGS

An example of the invention will now be described with reference to the accompanying drawings, in which.

DETAILED DESCRIPTION OF THE INVENTION

Figure 3:
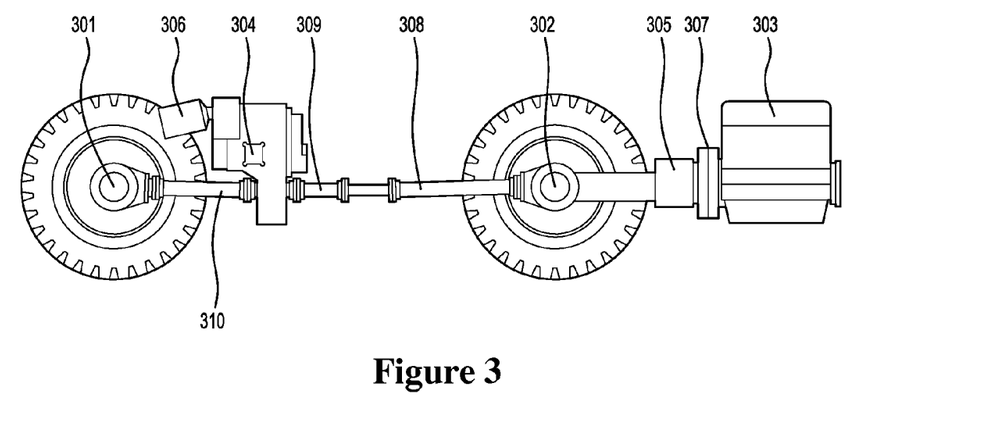
FIG. 3 illustrates the drive train of one embodiment of the present invention.

FIG. 3 is a cross sectional view of the drive train of one embodiment of the present invention. A motor 303 comprising a 240 kW diesel engine is positioned aft of a rear axle 302. The engine 303 drives a hydraulic pump train 305 via a pump drive coupling 307. Hydraulic hoses (not shown) pass hydraulic power from the hydraulic pump 305 to a hydraulic traction motor 306 which drives transmission 304. The transmission 304 is positioned forwardly of an articulation assembly 309, on the fore chassis immediately aft of the fore axle 301 (also referred to as the front axle). The transmission 304 drives the front axle 301 via front drive shaft 310, and drives the rear axle 302 via rear drive shaft 308. Rear drive shaft 308 includes an articulation assembly 309.

Thus, the diesel engine 303 directly drives the hydraulic pump 305, which in this embodiment is a variable displacement axial piston hydraulic system. The transmission 304 is positioned on the front chassis, forwardly of the articulation 309. The input to the transmission 304 is a variable displacement hydraulic motor 306, which in this embodiment is a hydrostatic axial piston motor. The transmission 304 in this embodiment is a three speed power shift transmission with pneumatic pilot gear selection and limited slip differential.

Figure 4:
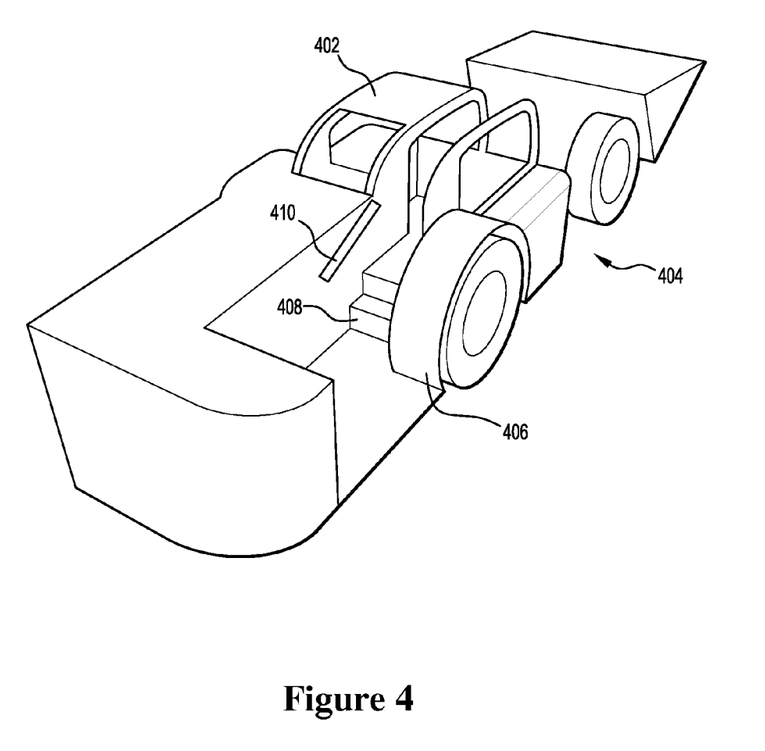
FIG. 4 illustrates the cabin position and layout in the embodiment of FIG. 3.

The drive train design of the embodiment of FIG. 3 addresses some key issues associated with the low height configuration and motion control. First, as can be seen in FIG. 3, the drive train does not occlude the space above the rear axle 302 nor the space above rear drive shaft 308, permitting the operator cabin 402 to instead be positioned in this space, as shown in FIG. 4. The cabin 402 is centrally positioned in the vehicle which improves the operator's visibility to both sides of the vehicle, as opposed to a side-mounted cabin. Moreover, the space made available above the rear axle 302 and above rear drive shaft 308 by the drive train configuration of FIG. 3 is sufficient to accommodate a driver cabin 402 which is large enough to accommodate a rotating seat for the operator. In this embodiment the rotating seat (not shown) is mounted within the cabin on a rotary bearing arrangement that allows the seat to be rotated and locked in north, east and south positions (fore, side, aft). In this embodiment the east, or transverse, seat position has the operator facing the right side of the vehicle relative to the direction of forward travel. This allows the operator to choose the seating position appropriate for the task at hand. For the majority of the time, typical LHD tasks require the operator to be viewing forwardly of the cabin. The present embodiment, in enabling the operator seat to be forward facing at all such times, offers increased comfort and improved posture, for example to assist the operator to endure road induced accelerations or impacts.

Moreover, the space made available above the rear axle 302 by the drive train of FIG. 3 is sufficient to accommodate an operator cabin with improved visibility features. The cabin 402 in this embodiment is thus configured to move vertically, for example to elevate when overhead clearance permits and when greater visibility is desired, while allowing the cabin to be moved vertically lower to allow access through low areas, such as old workings where roof height is low. Moreover, the space made available above the rear axle 302 and drive shaft 308 by the drive train of FIG. 3 is sufficient to accommodate an operator cabin which is configured to tilt, to enable the driver to set a suitable driving cabin attitude to suit the mine heading profile, for example to tilt the cabin backwards when facing downhill or to tilt the cabin forwards when facing uphill.

The drive train of FIG. 3 further enables safer machine ingress and egress. This is because the space made available above the rear axle 302 by the drive train of FIG. 3 is sufficient to accommodate operator access to the rear of the rear axle 302. The crush hazard in the articulation zone 404 is thus significantly reduced as the operator has access to the cabin 402 from behind the rear wheel arch 406 as shown in FIG. 4. The cabin access design includes a pathway with steps 408 and handrails 410 from the side of the machine.

This centrally positioned and rear accessed configuration of the operator's cabin is made possible by the transmission 304 being moved away from the rear axle 302 to the front articulation structure as shown in FIG. 3. Relocation of the transmission 304 is made possible by the use of the hydrostatic transmission drive that connects motive power of the engine 303 to the transmission 304 by hydraulic hose(s).

Figure 5A:
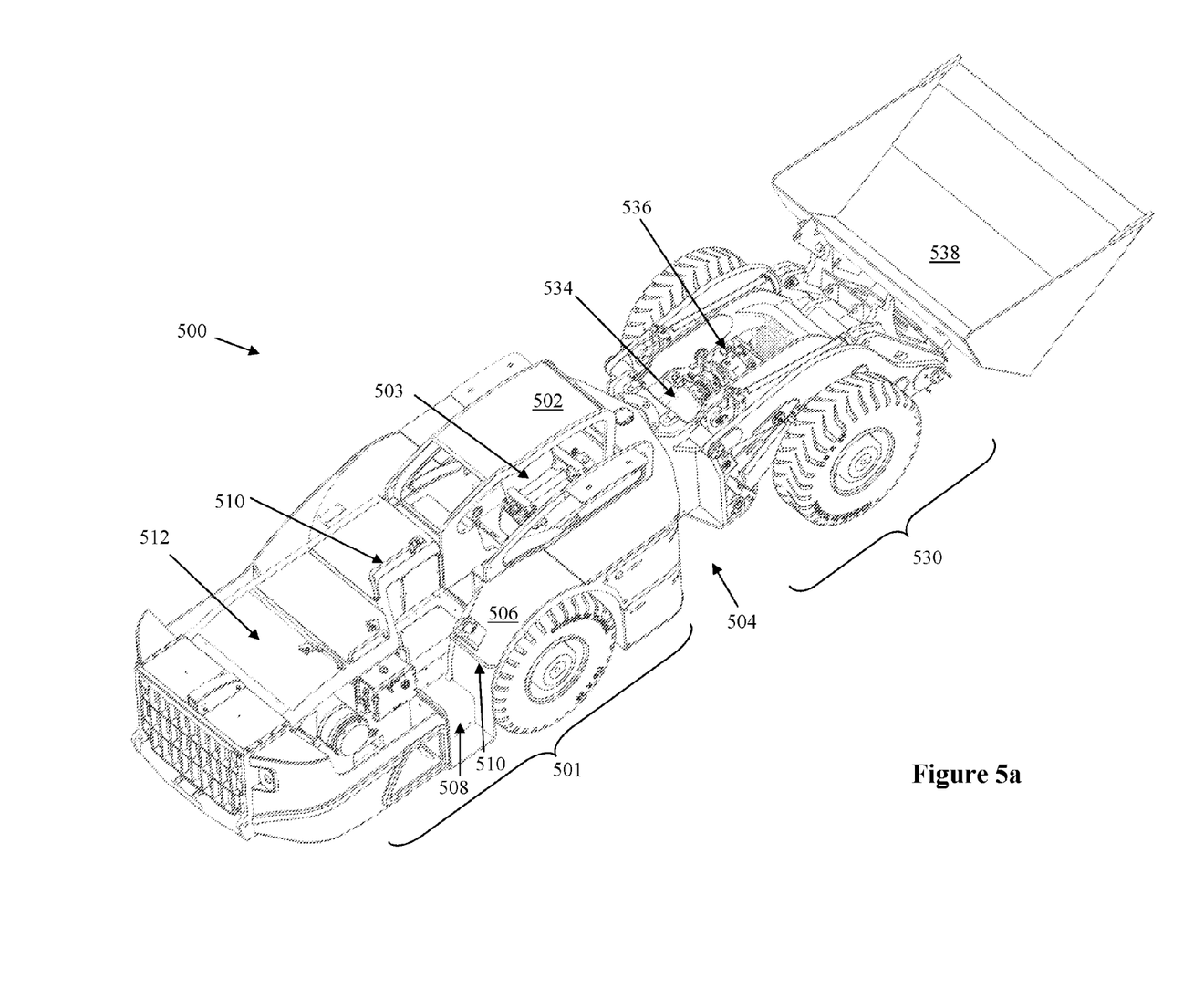
FIGS. 5A, 5B, and 5C illustrate a LHD vehicle in accordance with another embodiment of the invention.
Figure 5B:
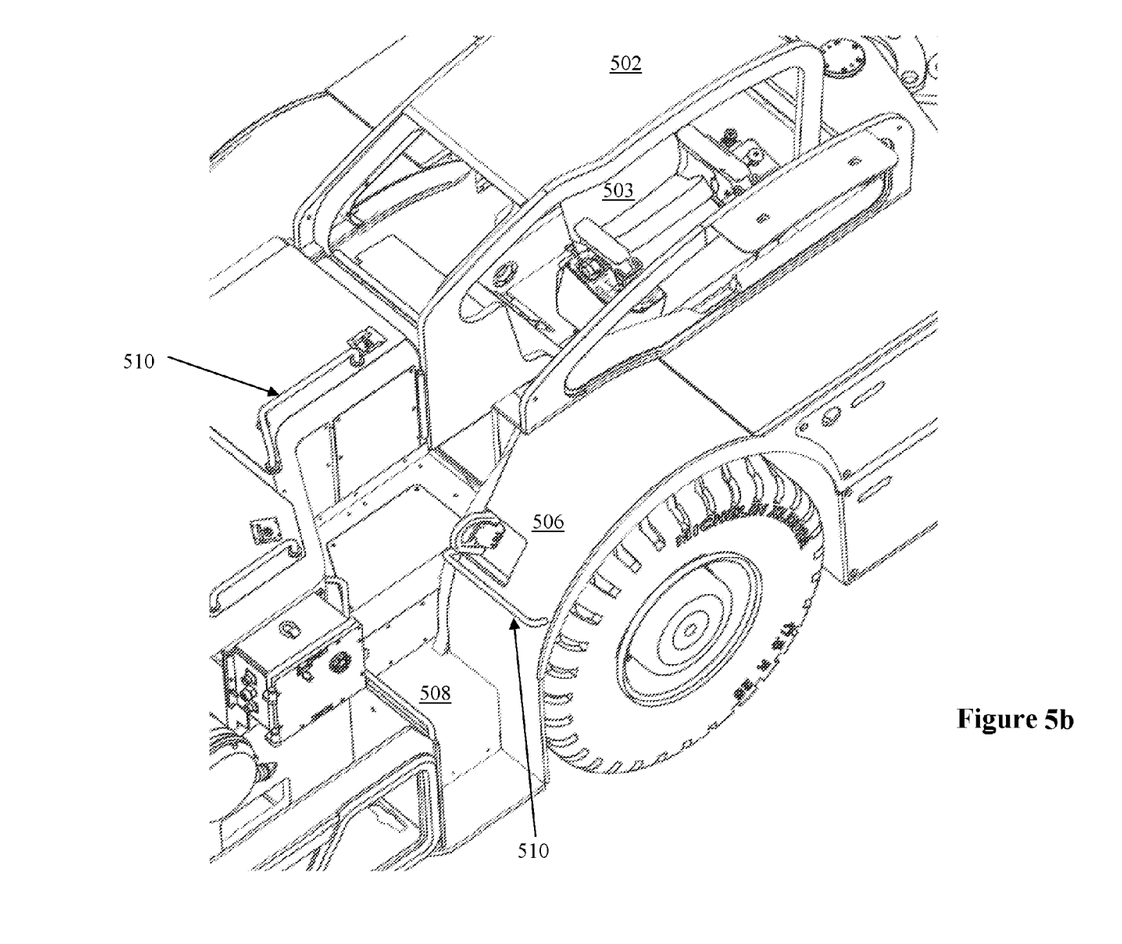
Figure 5C:
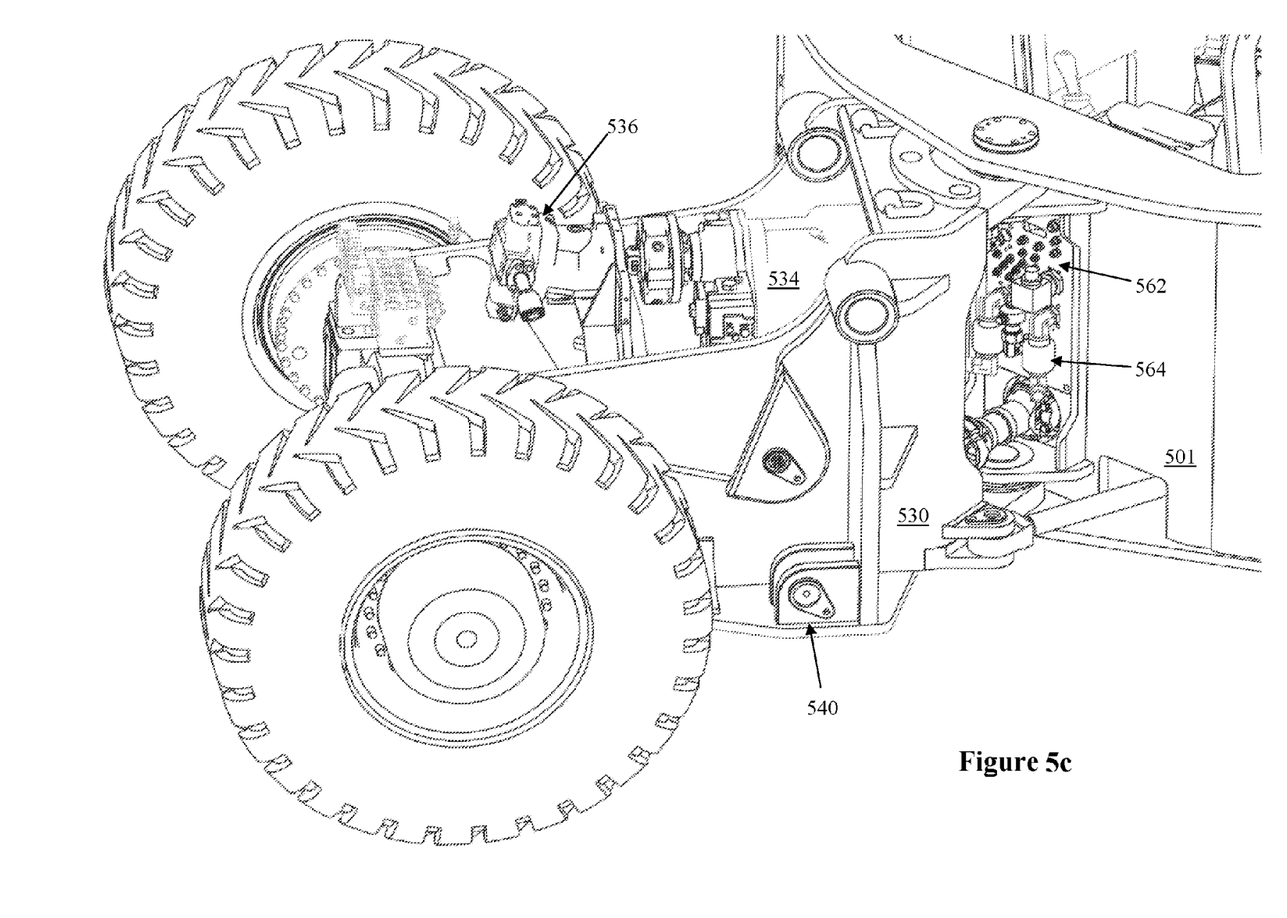

FIGS. 5A-5C illustrate a LHD vehicle in accordance with another embodiment of the invention. Again, having a drive train configuration of the type shown in FIG. 3 ensures that the drive train does not occlude the space above the rear axle nor above the rear drive shaft, permitting the operator cabin 502 to instead be positioned in this space, as shown in FIGS. 5A and 5B. The cabin 502 is substantially centrally positioned in the vehicle 500 which improves the operator's visibility to both sides of the vehicle, as opposed to a side-mounted cabin. Moreover, the space made available above the rear axle and rear drive shaft by this drive train configuration is sufficient to accommodate an operator cabin 502 which is large enough to accommodate a rotating seat 503 for the operator. In this embodiment the operator's seat 503 is mounted within the cabin 502 on a rotary bearing arrangement that allows the seat to be rotated and locked in north, east and south positions (fore, side, aft). In this embodiment the east, or transverse seat position has the operator facing the right side of the vehicle relative to the direction of forward travel, as shown. This allows the operator to choose the seating position appropriate for the task at hand. For the majority of the time, typical LHD tasks require the operator to be viewing forwardly of the cabin 502. The present embodiment, in enabling the operator seat 503 to be forward facing at all such times, offers increased comfort and improved posture, for example to assist the operator to endure road induced accelerations or impacts.

Moreover, the space made available above the rear axle by the drive train configuration of FIG. 3 is sufficient to accommodate an operator cabin 502 with improved visibility features. The cabin 502 in this embodiment is thus configured to move vertically, for example to elevate when overhead clearance permits and when greater visibility is desired, while allowing the cabin to be moved vertically lower to allow access through low areas, such as old workings where roof height is low. Moreover, the space made available above the rear axle and rear drive shaft by the drive train configuration of FIG. 3 is sufficient to accommodate an operator cabin 502 which is configured to tilt, to enable the operator to set a suitable driving cabin attitude to suit the mine heading profile, for example to tilt the cabin 502 backwards when facing downhill or to tilt the cabin forwards when facing uphill.

The drive train configuration of FIG. 3 further enables safer ingress and egress to the LHD vehicle 500. This is because the space made available above the rear axle by the drive train configuration of FIG. 3 is sufficient to accommodate operator access to the rear of the rear axle 302. The crush hazard in the articulation zone 504 is thus significantly reduced as the operator has access to the cabin 502 from behind the rear wheel arch 506 as shown in FIG. 5A. The cabin access design includes a pathway with steps 508 and handrails 510 from the side of the machine 500, shown more closely in the detailed view of FIG. 5B.

This centrally positioned and rear accessed configuration of the operator's cabin is made possible by the transmission 534 being moved away from the rear axle to the front articulation structure 530 as shown in FIG. 5A. Relocation of the transmission 534 is made possible by the use of the hydrostatic transmission drive that connects motive power of the engine, located under hatch 512, to the transmission 534 by hydraulic hose(s) and hydraulic motor 536.

FIG. 5A illustrates another beneficial consequence of the drivetrain configuration of the present embodiment. In the fore chassis 530, the central positioning of the hydraulic motor 536 and transmission 534 necessitates the use of laterally positioned hydraulic rams for controlling bucket 538, as opposed to the use of a single central ram. The rams in the embodiment of FIGS. 5A-5C are mounted at lateral positions such as shown at 540 (see FIG. 5C). However, the use of two (or more) hydraulic rams is beneficial in providing redundancy; in the event of a ram failure, the other ram(s) will hold the bucket and prevent a sudden unexpected motion of the bucket.

FIG. 5C further illustrates the transfer of hydraulic power from the rear chassis 501 to the fore chassis 530. As previously discussed, hydraulic hoses (not shown) pass hydraulic power derived from the engine under hatch 512 on the rear chassis 501, to the hydraulic traction motor 536 which drives transmission 534 both of which are on the fore chassis 530. In this embodiment, relatively inflexible hydraulic hoses are fixedly mounted within rear chassis 501, extending to a manifold plate 562 mounted on the fore chassis adjacent the articulation zone 504. Hydraulic hoses of sufficient flexibility to permit and withstand ongoing operational vehicle articulation, and with protective sheath or casement to withstand the mining environment, are then connected from the manifold plate outlet 564 to the hydraulic motor 536.

Figure 7A:
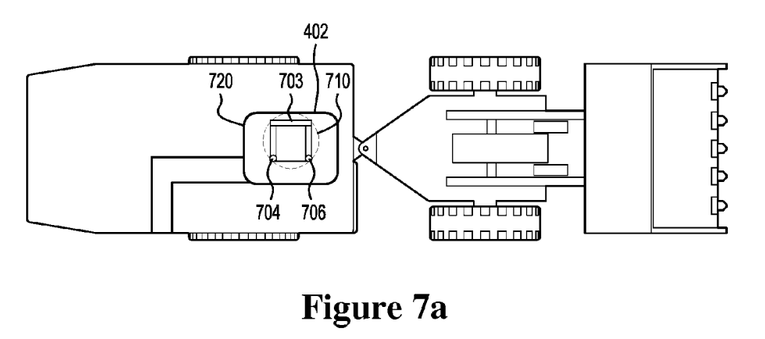
FIG. 7 illustrates the rotational positions between which the operator's seat may be rotated in the embodiment of FIG. 4.
Figure 7B:
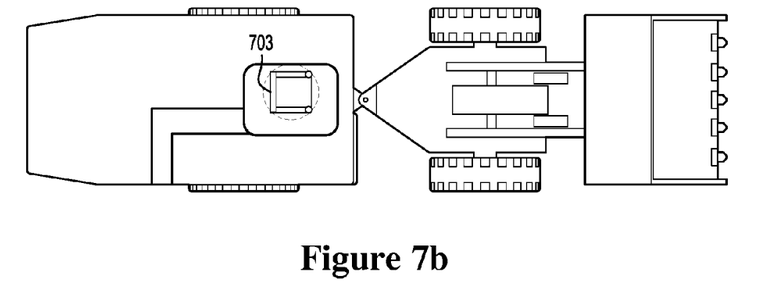
Figure 7C:
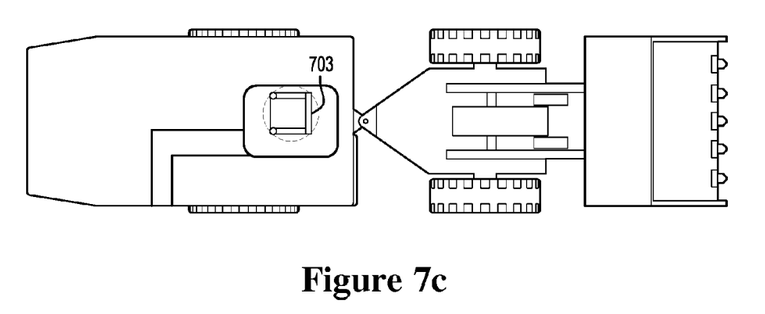

FIGS. 7a-7c illustrate the rotational positions between which the operator's seat may be rotated in the embodiment of FIG. 4. Cabin 402 contains the operator's seat which has a seat back 703 and operator joystick controls 704, 706 for the operator to hold and manipulate. The cabin 402 is sufficiently large to accommodate the rotation zone 710 of the seat, plus the additional zone 720 outside 710. Zone 720 is sufficient to give legroom when the user is seated and is also sufficient for user access to and from the seat, in any rotational position. FIG. 7a shows the transverse facing position, FIG. 7b shows the forward facing position, and FIG. 7c shows the aft facing position of the operator's seat.

Figure 8A:
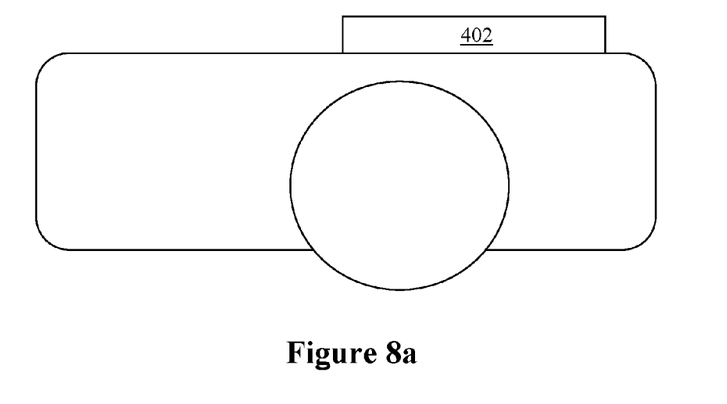
FIGS. 8A and 8B are partial illustrations of the rear portion of the LHD vehicle of FIG. 4, illustrating the vertical height control of the cabin.
Figure 8B:
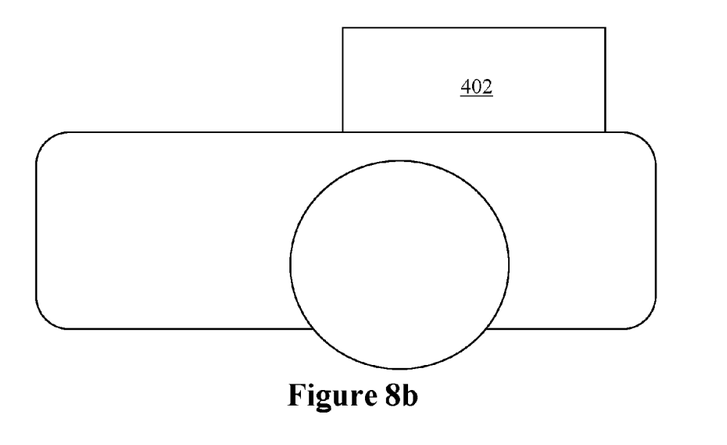

FIGS. 8A and 8B are partial illustrations of the rear portion of the LHD vehicle of FIG. 4, illustrating the vertical height control of the cabin 402. In FIG. 8A the operator cabin 402 is an a depressed position to permit the vehicle to pass through areas with low overhead clearance. In FIG. 8B, the cabin 402 is in a raised position to improve driver visibility in areas with greater overhead clearance.

Figure 9:
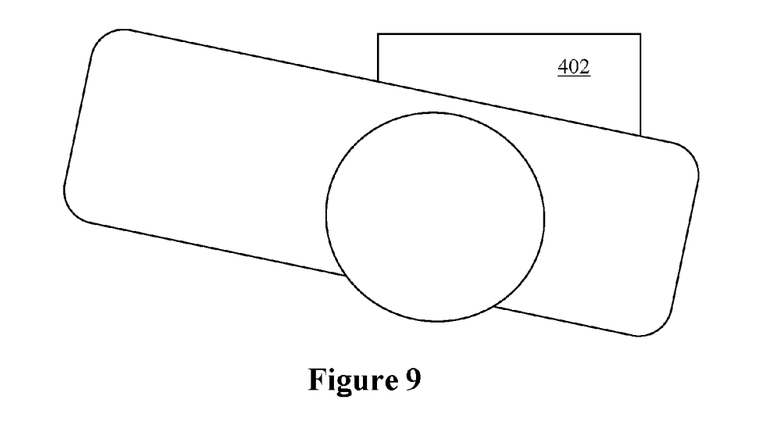
FIG. 9 is a partial view of the rear portion of the LHD vehicle of FIG. 4, illustrating the tilt function of the cabin 402.

FIG. 9 is a partial view of the rear portion of the LHD vehicle of FIG. 4, illustrating the tilt function of the cabin 402. As shown, when the LHD vehicle is travelling down a decline the cabin 402 can be tilt rearwardly to maintain the cabin 402 at or closer to the horizontal. Similarly, when the vehicle travels up an incline the cabin may be tilted forwardly to maintain the cabin 402 at or closer to the horizontal.

Figure 10:
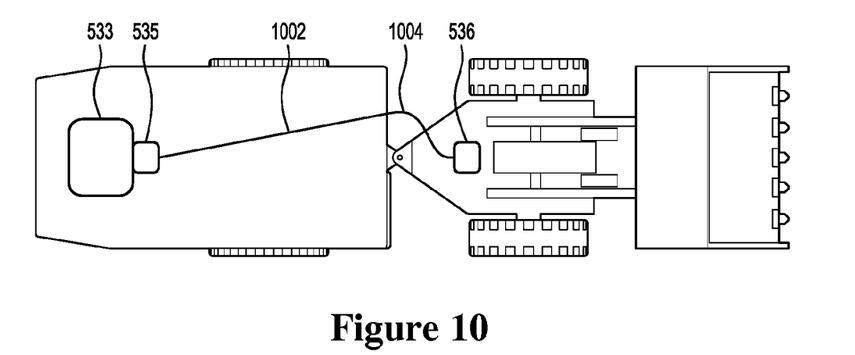
FIG. 10 is a schematic showing the hydraulic hose connection from the hydraulic pump on the rear chassis of the LHD vehicle to the hydraulic motor on the fore chassis in the embodiment of FIG. 5.

FIG. 10 is a schematic showing the hydraulic hose connection from the hydraulic pump 535 on the rear chassis of the LHD vehicle to the hydraulic motor 536 on the fore chassis. Diesel engine 533 powers the hydraulic pump 535. Hydraulic hoses 1002 and 1004 transfer the hydraulic power to the hydraulic motor 536. Hose section 1002 is relatively rigid and inflexible. Hose section 1004 is sufficiently flexible to withstand articulation of the vehicle.

The drive train configuration of FIG. 3 also provides additional benefits for motion control of the vehicle. The demand on brakes in the machine of FIGS. 3 and 4 is reduced by suitable hydrostatic transmission design, by use of the retardation control system shown in FIG. 6. A closed loop control system is provided, and includes control valving in the loop to optimize control for such heavy machinery. Engine friction, for example providing up to 100 kW, is used to dynamically brake the vehicle for example when travelling down a decline.

Figure 6:
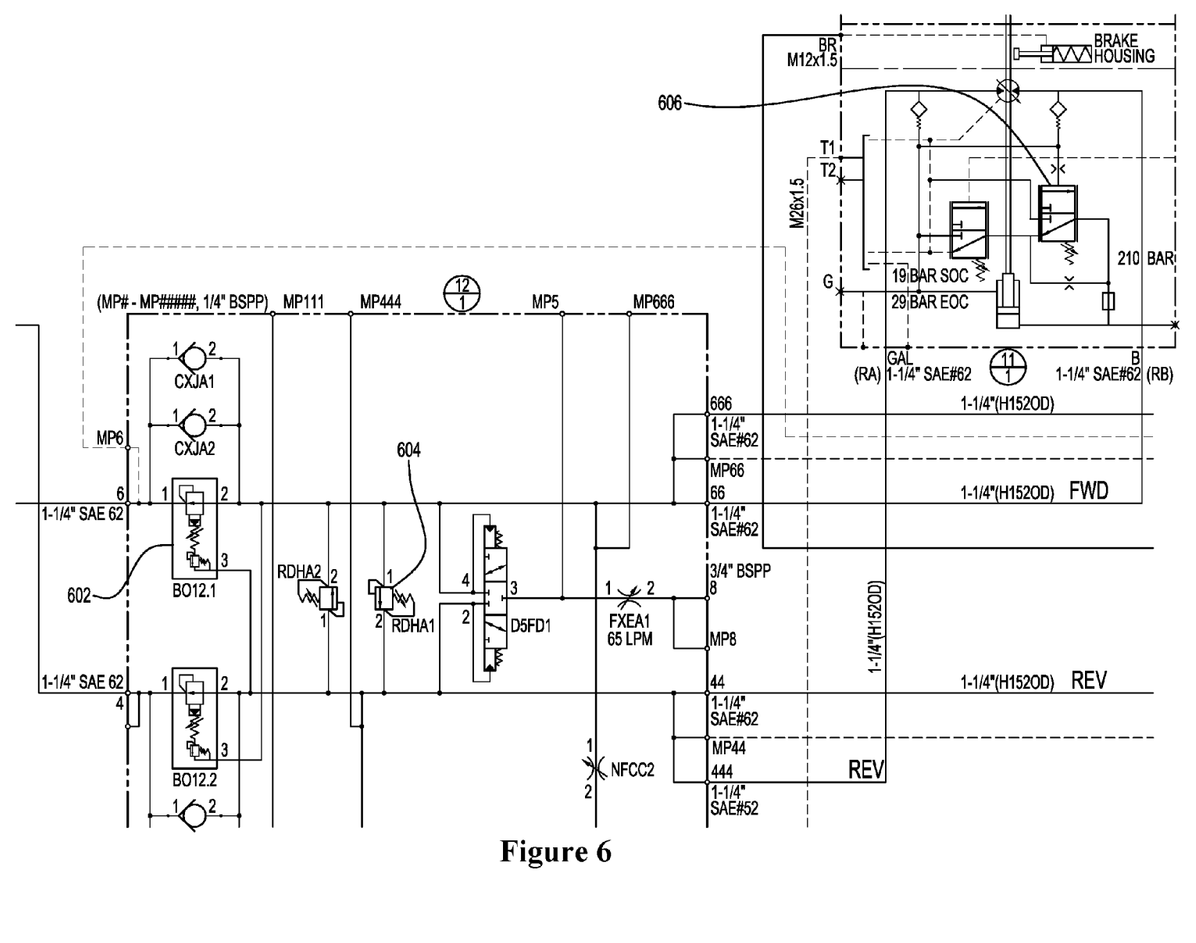
FIG. 6 illustrates the engine and hydrostatic retardation control system in the embodiment of FIGS. 3 and 4.

The control system of FIG. 6 is designed to first utilise engine friction braking, prior to introducing hydrostatic retardation. This is achieved by the control circuit by matching the motor induced pump drive pressure to the equivalent engine friction power. Thus, once the braking demands match or exceed the engine friction braking power limit, the control system will add hydrostatic retardation to the overall retardation of the machine, by increasing the retarding pressure against the transmission drive motor 306. As hydraulic pressure builds, the retardation pressure increases to slow the machine. In even heavier braking conditions, where the addition of the hydrostatic braking is not sufficient to stabilise machine speed and a hydraulic pressure limit is reached, the control system of FIG. 6 is configured to cause the transmission drive motor to swivel to maximum displacement. This action increases motor torque and hence retardation effort to stabilise the vehicle speed. Wet disc brakes need only be applied to provide final braking retardation if engine and hydraulic retardation is insufficient, thus significantly reducing wear on the wet disc brakes.

Retardation is thus a three stage process comprising (i) initial engine braking; (ii) application of additional hydrostatic braking; and (iii) automatic application of the drive motor to maximum displacement. Initial engine braking commences upon the reduction of fuel by the operator, which is equivalent to the operator releasing his foot from the accelerator. Braking is intensified if the pump angle is reduced toward the neutral position by the operator. Thereafter the extent of braking is operated automatically by hydraulic system pressure to activate retardation valves and swivel motor displacement. (Although in embodiments the vehicle retardation comprises a multi-stage process, the multi-stage process may include fewer steps than those indicated above. Thus, in embodiments the vehicle retardation may comprise two or more of: (i) initial engine braking; (ii) application of additional hydrostatic braking; (iii) automatic application of the hydraulic motor to maximum displacement; and/or (iv) wet disc braking)

The main retard valve 602, in this embodiment a B01227MP08 relief valve, is normally open. Valve 602 begins to restrict the flow when a pressure limit is reached, representing the engine friction power, to begin to add hydrostatic braking to engine braking The loop relief valves 604 are normally closed, and are protection devices built in to avoid over-pressurisation. The displacement modulation valve 606 is actuated at a prescribed pressure to swivel the drive motor to maximum displacement as described above.

By adding hydrostatic retardation at the point of maximum engine braking power with valve 602, this system avoids pushing the engine into an overspeed condition which can be destructive to the engine.

The combination of these features enabled by the drive train design of FIG. 3 thus provides a LHD vehicle that has safe access, good user ergonomics, good visibility and tight braking control when operating on steep grades. The need for servicing brakes is thereby reduced, decreasing the downtime and maintenance costs associated with operating the machine.

It is to be appreciated that alternative embodiments also lie within the scope of the invention as set forth herein. For example a first alternative embodiment of the invention may utilise a hydrostatic transmission and double motors. In this embodiment the diesel engine and hydraulic pump's operation, is the same as depicted in the embodiment of FIG. 3. However in place of transmission 304 a hydraulic double motor is provided. The double motor comprises of two rotary groups on a common shaft. This design allows the component to be placed directly in line with the drive train with a drive shaft coupled on each end. The motors are a swash plate type design that allows the displacement to be varied and controlled from maximum to minimum displacement. This configuration provides for both high torque (maximum displacement) at low speed and high speed (minimum displacement) with lower torque. There is no gear change, and the speed change is stepless and is controlled automatically by the control system. Because the motor is inline with the drive shaft in this embodiment, all torque can be transferred to a selected one axle if required. This is important in a loader application where the rear wheels may lose contact with the ground when mucking into a heap. With differential locks on the axles, the machine is a true four wheel drive (4WD) configuration. Machine stability is also an issue in this industry. As a machine is articulated, the position of the load and counter mass moves closer to the tip-over plane. Machines constructed with a long rear overhang risk tip over when the machine is articulated, and this can occur even when empty. The hydrostatic machine of this alternative embodiment will allow greater flexibility in placement of major components and may be used to provide a more stable machine.

A second alternative embodiment comprises a hydrostatic transmission and wheel motors. In this embodiment, two traction pumps are used, one to control the Drivers Side (DS) wheels, the other for the Off Drivers Side (ODS). This configuration allows the wheels on opposing sides of the machine to be controlled closely to manoeuver the LHD vehicle around tight corners. A cam arrangement located on the articulation hitch responds to changes in articulation angle to cause the wheel speed of the inside wheels to be slower than the outside wheels when the machine is articulated. This Automatic Forced Differential (AFD) responds to the input of the operator's steering wheel and therefore does not require specialized skill from the operator. In this embodiment the pumps and motors are in a closed loop system, which enables hydrostatic braking upon release of the throttle pedal, and can control even a relatively heavy load down a decline without disc brake operation being required. In this case retardation torque is in proportion to motor displacement and maximum displacement should be selected for down-hill operation. The closed loop is cooled by purging oil from the loop, forced out by incoming oil at slightly higher pressure. Oil purged from the loop is passed through a cooler to maintain an operating temperature within the design range of components and fluid. A flow divider is used to equally split pump flow to each motor pair. The flow divider or differential lock is automatically engaged when both motors are in maximum displacement. As wheel slip will be most evident in the unladen condition due to flotation of tyres, when the vehicle is unladen the 4WD maximum displacement is engaged which in turn engages the diff lock function. To increase the return (unladen) speed of the LHD vehicle, when the vehicle is unladen the rear wheel drive motors are disengaged and all pump flow passes through the front drive wheels, doubling the ground speed. In this condition the pistons in the idling motors are lifted from the motor cam track by case pressure and the motor will free wheel. To engage the two wheel drive (2WD) function the control system demands that the machine must be stopped and the park brake applied before the 2WD mode will be switched at the free wheel valve. Implement handling and steering functions are powered by a load sense piston pump coupled in line with the traction pumps. This pump will 'stand-by' at 25 bar until the load sense signal from the function brings the pump onto stroke. The pump will pump oil in proportion to the movement of the valve bank handle displacement or the steering wheel rotation speed.

Reference herein to a "control device" includes control devices such as microprocessors, discrete circuits connected to step motors, and analog circuits.

As noted above, in an embodiment, the operator cabin is a tilting cabin. In other embodiments, the operator cabin is (alternatively or additionally) vertically adjustable, in regards to height. In regards to the latter, the operator cabin may comprise a vertical height control mechanism for controlling a vertical height of the operator cabin. In either or both cases, the operator cabin may comprise support and actuation structure for the operable cabin to be tilted and/or vertically adjusted. Such structure may comprise, for example: a floating operator cab frame (floating meaning not permanently fixed in place); a recess in the rear chassis that receives the operator cab frame; guides affixed to the recess; a movable/variable mechanical connection between the frame and guides (e.g., the frame may include members that slide in the guides); and actuators for controllably positioning and holding in place the floating operator cab frame (e.g., hydraulic cylinders). (The vertical height control mechanism mentioned above, therefore, may comprise such structure in combination with a control module, e.g., hardware and/or software for controlling the actuators, for example.)

In another embodiment, a vehicle comprises a front axle and a rear axle, an articulation in the vehicle between the front and rear axles, and one or more hydraulic motors, wherein at least one of the one or more hydraulic motors is positioned to the front of the articulation. The vehicle further comprises at least one hydraulic pump configured to drive the one or more hydraulic motors, and a combustion engine (e.g., positioned to the rear of the rear axle) configured to power the at least one hydraulic pump. The one or more hydraulic motors are configured to drive at least one of: the front axle and the rear axle; or one or more wheels attached to the front axle and rear axle, for movement of the vehicle.

In another embodiment of the vehicle, the vehicle further comprises a transmission operably interposed between the one or more hydraulic motors and the front axle and the rear axle. The one or more hydraulic motors are configured to drive the front axle and the rear axle through the transmission.

In another embodiment of the vehicle, the vehicle further comprises a fore chassis and a rear chassis. The front axle is operably coupled to the fore chassis and the rear axle is operably coupled to the rear chassis. The articulation is located between the fore chassis and the rear chassis. The vehicle further comprises an operator cab attached to the rear chassis and positioned substantially centrally of the vehicle, and an operator access way comprising one or more hand rails and at least one of one or more steps or a ramp for operator access to the operator cab from behind the rear axle and away from the articulation. The vehicle further comprises a bucket attached to the fore chassis and operable for movement of the bucket to scoop and release material. In addition, the transmission is coupled to the fore chassis and is configured to drive the front axle via a first drive shaft and to drive the rear axle via an articulated second drive shaft.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. A vehicle comprising:
    a front axle and a rear axle;
    a fore chassis and a rear chassis, wherein the front axle is operably coupled to the fore chassis and the rear axle is operably coupled to the rear chassis;
    at least one articulation in the vehicle between the front chassis and the rear chassis, for the front chassis and the rear chassis to articulate relative to one another;
    a motor positioned to the rear of the rear axle;
    a hydraulic pump operably coupled to be powered by the motor;
    a hydraulic motor positioned on the fore chassis to the front of a foremost articulation of the at least one articulation, the hydraulic motor configured to be hydraulically driven by the hydraulic pump; and
    a transmission configured to be driven by the hydraulic motor, the transmission configured to drive the front axle and rear axle via respective drive shafts.

2. The vehicle of claim 1, wherein the motor is a combustion engine.

3. The vehicle of claim 1, further comprising an operator cabin positioned substantially centrally of the vehicle on the rear chassis of the vehicle.

4. The vehicle of claim 3, wherein the operator cabin is a tilting cabin.

5. The vehicle of claim 3, wherein the operator cabin comprises a vertical height control mechanism for controlling a vertical height of the operator cabin.

6. A vehicle comprising:
a front axle and a rear axle;
an articulation in the vehicle between the front and rear axles;
a motor positioned to the rear of the rear axle;
a hydraulic pump operably coupled to be powered by the motor;
a hydraulic motor positioned to the front of the articulation, the hydraulic motor configured to be hydraulically driven by the hydraulic pump;
a transmission configured to be driven by the hydraulic motor, the transmission configured to drive the front axle and rear axle via respective drive shafts; and
an operator cabin positioned substantially centrally of the vehicle on a rear chassis of the vehicle, wherein the operator cabin is positioned forwardly of the rear axle and above a rear drive shaft of the respective drive shafts.

7. The vehicle of claim 6, wherein the operator cabin is provided with an operator access way to the rear of the rear axle comprising one or more hand rails and at least one of one or more steps or a ramp.

8. A vehicle comprising:
a front axle and a rear axle;
an articulation in the vehicle between the front and rear axles;
a motor positioned to the rear of the rear axle;
a hydraulic pump operably coupled to be powered by the motor;
a hydraulic motor positioned to the front of the articulation, the hydraulic motor configured to be hydraulically driven by the hydraulic pump;
a transmission configured to be driven by the hydraulic motor, the transmission configured to drive the front axle and rear axle via respective drive shafts; and
an operator cabin positioned on a rear chassis of the vehicle, wherein the operator cabin comprises a rotating seat, rotatable between at least two rotational positions comprising a forward facing position, a transverse-facing position, and an aft-facing position.

9. The vehicle of claim 8 wherein operator controls are adapted to control the vehicle in a manner which maintains the operator's perspective as defined by the current rotational position of the seat.

10. A vehicle comprising:
a front axle and a rear axle;
an articulation in the vehicle between the front and rear axles;
a motor positioned to the rear of the rear axle;
a hydraulic pump operably coupled to be powered by the motor;
a hydraulic motor positioned to the front of the articulation, the hydraulic motor configured to be hydraulically driven by the hydraulic pump;
a transmission configured to be driven by the hydraulic motor, the transmission configured to drive the front axle and rear axle via respective drive shafts; and
one or more hydraulic hoses to effect drive of the hydraulic motor by the hydraulic pump, the hydraulic hoses being flexible at least across an articulation zone of the vehicle.

11. The vehicle of claim 10 wherein the one or more hydraulic hoses are inflexible between the hydraulic motor and the articulation zone of the vehicle.

12. A vehicle comprising:
a front axle and a rear axle;
an articulation in the vehicle between the front and rear axles;
a motor positioned to the rear of the rear axle;
a hydraulic pump operably coupled to be powered by the motor;
a hydraulic motor positioned to the front of the articulation, the hydraulic motor configured to be hydraulically driven by the hydraulic pump; and
a transmission configured to be driven by the hydraulic motor, the transmission configured to drive the front axle and rear axle via respective drive shafts,
wherein in at least one mode of operation, the hydraulic motor is configured to provide hydrostatic vehicle retardation.

13. The vehicle of claim 12 wherein the hydrostatic vehicle retardation comprises a multi-stage process including at least two of: (i) initial engine braking; (ii) application of additional hydrostatic braking; (iii) automatic application of the hydraulic motor to maximum displacement; and (iv) wet disc braking.

14. A method of powering a vehicle, the method comprising:
powering a hydraulic pump with a combustion engine positioned to the rear of a rear axle of the vehicle;
the hydraulic pump hydraulically driving a hydraulic motor positioned forwardly of an articulation of the vehicle;
the hydraulic motor driving a transmission;
the transmission driving front and rear axles of the vehicle via respective drive shafts; and
hydrostatic vehicle retardation of the vehicle, the hydrostatic vehicle retardation comprising at least two of: (i) initial engine braking; (ii) application of additional hydrostatic braking; (iii) automatic application of the hydraulic motor to maximum displacement; and (iv) wet disc braking.

15. A vehicle comprising:
a front axle and a rear axle;
a fore chassis and a rear chassis, wherein the front axle is operably coupled to the fore chassis and the rear axle is operably coupled to the rear chassis;
at least one articulation in the vehicle between the front chassis and the rear chassis, for the front chassis and the rear chassis to articulate relative to one another;
one or more hydraulic motors, wherein at least one of the one or more hydraulic motors is positioned on the fore chassis to the front of a foremost articulation of the at least one articulation;
at least one hydraulic pump configured to drive the one or more hydraulic motors; and
a combustion engine configured to power the at least one hydraulic pump;
wherein the one or more hydraulic motors are configured to drive at least one of: the front axle and the rear axle; or one or more wheels attached to the front axle and rear axle, for movement of the vehicle.

16. The vehicle of claim 15, further comprising a transmission operably interposed between the one or more hydraulic motors and the front axle and the rear axle, wherein the one or more hydraulic motors are configured to drive the front axle and the rear axle through the transmission.

17. A vehicle comprising:
a front axle and a rear axle;
an articulation in the vehicle between the front and rear axles;
one or more hydraulic motors, wherein at least one of the one or more hydraulic motors is positioned to the front of the articulation;
at least one hydraulic pump configured to drive the one or more hydraulic motors;
a combustion engine configured to power the at least one hydraulic pump, wherein the one or more hydraulic motors are configured to drive at least one of: the front axle and the rear axle; or one or more wheels attached to the front axle and rear axle, for movement of the vehicle;
a transmission operably interposed between the one or more hydraulic motors and the front axle and the rear axle, wherein the one or more hydraulic motors are configured to drive the front axle and the rear axle through the transmission;
a fore chassis and a rear chassis, wherein the front axle is operably coupled to the fore chassis and the rear axle is operably coupled to the rear chassis, and wherein the articulation is located between the fore chassis and the rear chassis;
an operator cab attached to the rear chassis and positioned substantially centrally of the vehicle;
an operator access way comprising one or more hand rails and at least one of one or more steps or a ramp for operator access to the operator cab from behind the rear axle and away from the articulation; and
a bucket attached to the fore chassis and operable for movement of the bucket to scoop and release material,
wherein the combustion engine is positioned to the rear of the rear axle; and the transmission is coupled to the fore chassis and is configured to drive the front axle via a first drive shaft and to drive the rear axle via an articulated second drive shaft.

* * * * *